United States Patent
Hou et al.

(10) Patent No.: US 11,536,844 B2
(45) Date of Patent: Dec. 27, 2022

(54) DYNAMIC SENSOR RANGE DETECTION FOR VEHICLE NAVIGATION

(71) Applicant: Beijing Voyager Technology Co., Ltd., Beijing (CN)

(72) Inventors: Chengan Hou, Sunnyvale, CA (US); Xufeng Han, Cupertino, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 546 days.

(21) Appl. No.: 16/220,152

(22) Filed: Dec. 14, 2018

(65) Prior Publication Data

US 2020/0191970 A1 Jun. 18, 2020

(51) Int. Cl.
| | | |
|---|---|---|
| *G01S 17/931* | (2020.01) | |
| *G06T 7/521* | (2017.01) | |
| *G06F 9/30* | (2018.01) | |
| *G06V 20/56* | (2022.01) | |
| *G06V 20/58* | (2022.01) | |

(52) U.S. Cl.
CPC ........ *G01S 17/931* (2020.01); *G06F 9/30003* (2013.01); *G06T 7/521* (2017.01); *G06V 20/588* (2022.01); *G06T 2207/10028* (2013.01); *G06V 20/58* (2022.01)

(58) Field of Classification Search
CPC .... G01S 17/89; G01S 17/931; G06F 9/30003; G06K 9/00798; G06K 9/00805; G06K 9/6273; G06T 7/521; G06T 2207/10028
See application file for complete search history.

(56) References Cited

U.S. PATENT DOCUMENTS

| | | | | |
|---|---|---|---|---|
| 10,663,594 | B2 * | 5/2020 | Tsishkou | G06V 10/32 |
| 2006/0038885 | A1 | 2/2006 | Eggers et al. | |
| 2012/0101680 | A1 * | 4/2012 | Trepagnier | G01S 17/86 |
| | | | | 701/25 |
| 2015/0194057 | A1 * | 7/2015 | Jin | B60W 30/12 |
| | | | | 348/148 |
| 2016/0210525 | A1 * | 7/2016 | Yang | G06V 30/2504 |
| 2017/0307743 | A1 * | 10/2017 | Izzat | G01C 11/02 |
| 2018/0225968 | A1 | 8/2018 | Wang | |
| 2018/0232947 | A1 * | 8/2018 | Nehmadi | G01S 7/295 |
| 2018/0307915 | A1 * | 10/2018 | Olson | G05D 1/0251 |
| 2018/0372866 | A1 * | 12/2018 | Baba | G06V 10/22 |
| 2019/0092235 | A1 * | 3/2019 | Kim | G06V 10/25 |

(Continued)

FOREIGN PATENT DOCUMENTS

CN 104793619 A 7/2015

OTHER PUBLICATIONS

PCT International Search Report and the Written Opinion dated Mar. 27, 2019, issued in related International Application No. PCT/US2018/068130 (10 pages).

*Primary Examiner* — Peet Dhillon
(74) *Attorney, Agent, or Firm* — Sheppard Mullin Richter & Hampton LLP (57) ABSTRACT

Sensor information and map information may be obtained. The sensor information may characterize positions of objects in an environment of a sensor. The map information may characterize a road configuration in an environment of a vehicle. A sensor range configuration for the vehicle may be determined based on the road configuration in the environment of the vehicle. A portion of the sensor information may be processed for vehicle navigation based on the sensor range configuration.

13 Claims, 9 Drawing Sheets

(56) References Cited

U.S. PATENT DOCUMENTS

| | | | |
|---|---|---|---|
| 2019/0147250 A1* | 5/2019 | Zhang | G06V 20/41 |
| | | | 382/224 |
| 2019/0179317 A1* | 6/2019 | Englard | G01S 13/867 |
| 2019/0355144 A1* | 11/2019 | Korobov | G06T 7/11 |

* cited by examiner

DYNAMIC SENSOR RANGE DETECTION FOR VEHICLE NAVIGATION

TECHNICAL FIELD

The disclosure relates generally to dynamic sensor range detection for vehicle navigation.

BACKGROUND

Navigation for a vehicle, such as an autonomous vehicle, may be provided based on objects within an environment of the vehicle. Objects within the environment of the vehicle may be detected based on processing of sensor data, such as data generated by a LIDAR of the vehicle. Processing of sensor data may be process intensive, requiring high expenditure of processing power and time. Having insufficient processing resources may result in delayed or inaccurate detection of objects within the environment of the vehicle.

SUMMARY

One aspect of the present disclosure is directed to a system for dynamic range detection. The system may comprise one or more processors and a memory storing instructions. The instructions, when executed by the one or more processors, may cause the system to perform: obtaining sensor information, the sensor information defining a three-dimensional point cloud that characterizes positions of objects in an environment of a sensor; obtaining map information, the map information characterizing a road configuration in an environment of a vehicle, the road configuration in the environment of the vehicle including a physical arrangement of one or more roads in the environment of the vehicle; determining a sensor range configuration for the vehicle based on the road configuration in the environment of the vehicle, the sensor range configuration including a three-dimensional shape; and processing a portion of the sensor information for vehicle navigation based on the sensor range configuration such that a portion of the three-dimensional point cloud within the three-dimensional shape is processed for the vehicle navigation. The sensor range configuration for the vehicle may be determined further based on a movement of the vehicle.

Another aspect of the present disclosure is directed to a method for dynamic range detection. The method may comprise: obtaining sensor information, the sensor information characterizing positions of objects in an environment of a sensor; obtaining map information, the map information characterizing a road configuration in an environment of a vehicle; determining a sensor range configuration for the vehicle based on the road configuration in the environment of the vehicle; and processing a portion of the sensor information for vehicle navigation based on the sensor range configuration.

Yet another aspect of the present disclosure is directed to a system for dynamic range detection. The system may comprise one or more processors and a memory storing instructions. The instructions, when executed by the one or more processors, may cause the system to perform: obtaining sensor information, the sensor information characterizing positions of objects in an environment of a sensor; obtaining map information, the map information characterizing a road configuration in an environment of a vehicle; determining a sensor range configuration for the vehicle based on the road configuration in the environment of the vehicle; and processing a portion of the sensor information for vehicle navigation based on the sensor range configuration.

In some embodiments, the sensor range configuration may be defined in two-dimensions.

In some embodiments, the sensor range configuration may be defined in three-dimensions.

In some embodiments, the sensor may include a LIDAR. The sensor information may define a three-dimensional point cloud characterizing the positions of the objects in the environment of the LIDAR. The sensor range configuration may include a three-dimensional shape. Processing the portion of the sensor information based on the sensor range configuration may include processing a portion of the three-dimensional point cloud within the three-dimensional shape.

In some embodiments, the road configuration in the environment of the vehicle may include a physical arrangement of one or more roads in the environment of the vehicle. The physical arrangement of the one or more roads may include a curvature, a grade, an intersection, an exit, an on-ramp, or a number of lanes of the one or more roads.

In some embodiments, the sensor range configuration for the vehicle may be determined further based on a movement of the vehicle. The movement of the vehicle may include a planned movement of the vehicle.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein improve technologies for processing sensor information. By changing a sensor range configuration for a vehicle based on a road configuration in an environment of the vehicle, only the relevant portion(s) of collected sensor data may be processed for vehicle navigation. Different types of road configurations may result in different portions of the collected sensor data being targeted for processing. For example, specific portions of the collected sensor data may be processed for object detection based on the road configuration. Such targeted processing of sensor data may facilitate more accurate and timely detection of objects within the environment of the vehicle and reduce the processing resources required for object detection.

Figure 1:
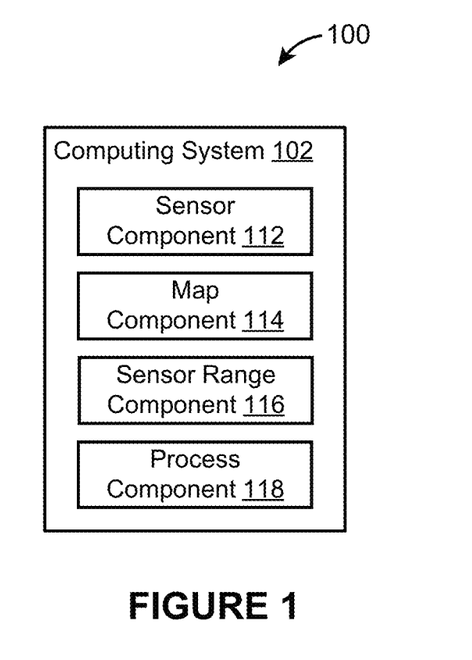
FIG. 1 illustrates an example environment for dynamic range detection, in accordance with various embodiments of the disclosure.

FIG. 1 illustrates an example environment 100 for dynamic range detection, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. The computing system 102 may include other computing resources or have access (e.g., via one or more connections/networks) to other computing resources.

The computing system 102 may include a sensor component 112, a map component 114, a sensor range component 116, and a process component 118. The computing system 102 may include other components. The computing system 102 may be part of a vehicle, a server communicating with a vehicle, and/or other computing devices.

While the computing system 102 is shown in FIG. 1 as single entities, this is merely for ease of reference and is not meant to be limiting. One or more components or functionalities of the computing system 102 described herein may be implemented in a single computing device or multiple computing devices. For example, one or more components/functionalities of the computing system 102 may be implemented in a single computing device or distributed across multiple computing devices.

The sensor component 112 may be configured to obtain sensor information. Obtaining sensor information may include one or a combination of accessing, acquiring, analyzing, determining, examining, generating, identifying, loading, locating, opening, receiving, retrieving, reviewing, storing, or otherwise obtaining the sensor information. The sensor component 112 may obtain sensor information from a hardware component, such as an electronic storage or a sensor, or a software component, such as a process running on a computing device. The sensor component 112 may obtain the sensor information directly from a device that determined or generated the sensor information or through one or more intermediary devices (e.g., routers, modems, servers). The sensor information may be pushed to the sensor component 112. The sensor information may be pulled by the sensor component 112.

Sensor information may be generated based on operation of one or more sensors. Sensor information may be generated by the sensor(s) or based on other information generated by the sensor(s). A sensor may refer to a device that detects or measures one or more physical properties. A sensor may record, indicate, or otherwise respond to the detected/measured physical propert(ies). For example, a sensor may include one or a combination of following sensors: an image sensor, a proximity sensor, a LIDAR, a motion sensor, a radar. Other sensors are contemplated. A sensor may operate to detect objects within an environment of a vehicle. A sensor may be part of the vehicle or remote from the vehicle. A sensor may be mechanically, electrically, or communicatively coupled to the vehicle. For example, sensor information may be generated by or based on a sensor carried by a vehicle, such as a LIDAR, that determines positions (e.g., location) or changes in positions (e.g., movement) of objects around the vehicle.

Sensor information may characterize positions of objects in an environment of a sensor. An environment of a sensor may refer to one or more physical areas of the sensor, such as one or more portions of surroundings of the sensor. Objects in an environment of a sensor may refer to living or non-living things in the surroundings of the sensor. For example, sensor information may characterize positions of vehicles, road markers (e.g., two dimensional or three-dimensional markings on the road), structures (e.g., buildings, trees, light pole, traffic light, road sign), persons, animals, or other objects in the environment of the sensor. Sensor information may characterize positions of objects in an environment of a sensor by including values or other data that are indicative or descriptive of the positions of objects in the environment of the sensor. A position of an object may refer to an absolute location of the object (e.g., with respect to Earth), a relative location of the object (e.g., with respect to the sensor), a movement of the object, such as a direction of movement, a speed of movement, or an acceleration of movement of the object, or other position of the object.

For example, sensor information may characterize positions of objects in an environment of a LIDAR. Based on LIDAR's measurement of emitted beam, a two-dimensional or a three-dimensional point cloud may be generated. The point cloud may characterize the positions of the objects in the environment of the LIDAR. The point cloud may include one or more sets of data points in a coordinate system, such as Cartesian coordinate system, polar coordinate system, cylindrical coordinate system, spherical coordinate system, or other coordinate systems. The location of data points within the coordinate system may represent positions of objects in the environment of the LIDAR. The location of the data points within the coordinate system may represent or be used to determine locations, shapes, dimensions, or other physical characteristics of objects in the environment of the LIDAR. For example, different data points may represent external surfaces of objects located within the environment. The sensor information may define the point cloud or other information relating to the objects detected by the LIDAR.

Sensor information may characterize other aspects of the environment of a sensor. For example, sensor information may characterize operating status of object(s) in the environment of the sensor. For instance, sensor information may provide information on how a nearby vehicle is operating or a status of a nearby traffic light (e.g., green, yellow, red, flashing yellow). Other sensor information are contemplated.

The map component 114 may be configured to obtain map information. Obtaining map information may include one or a combination of accessing, acquiring, analyzing, determining, examining, generating, identifying, loading, locating, opening, receiving, retrieving, reviewing, storing, or otherwise obtaining the map information. The map component 114 may obtain map information from a hardware component or a software component. The map information may be pushed to the map component 114. The map information may be pulled by the map component 114. For example, the map component 114 may obtain the map information from a memory of the computing system 102 or from a device (e.g., a server) communicating with the computing system 102.

Map information may characterize a road configuration in an environment of a vehicle. A vehicle may refer to a thing used for transportation. A vehicle may include an autonomous vehicle. An autonomous vehicle may refer to a vehicle that is capable of navigating without human input. An autonomous vehicle may be fully autonomous or partially autonomous.

An environment of a vehicle may refer to one or more physical areas of the vehicle, such as one or more portions of surroundings of the vehicle. For example, an environment of a vehicle may include an area in front of the vehicle, an area behind the vehicle, an area to the left of the vehicle, an area to the right of the vehicle, an area above the vehicle, an area below the vehicle, or other areas around the vehicle. An environment of a vehicle may refer to one or more physical areas near the vehicle, such as one or more portions of the road on which the vehicle is expected to travel or one or more portions of a road adjacent to the road on which the vehicle is traveling.

A road configuration may refer to an arrangement of one or more roads in a particular form. For example, a road configuration in the environment of a vehicle may include a physical arrangement of one or more roads in the environment of the vehicle. The physical arrangement of road(s) may include one or a combination of the following features: curvature of road(s), grade of road(s), type of road(s), intersection of road(s), the presence of an exit, the presence of an on-ramp, the presence of a bike lane, the presence of a sidewalk, the number of roads, a number of lanes of the road(s). Other physical arrangement of the road(s) are contemplated. A road configuration may refer to flow of traffic on the road(s). For example, the road configuration may include the presence of street/traffic light(s), the status of street/traffic light(s), the presence of street/traffic sign(s), the presence of road obstruction(s) (e.g., construction, accident), the amount of traffic congestion, or other indication of how traffic is flowing on the road(s).

In some embodiments, the map component 114 may obtain map information based on a location of the vehicle. A location of the vehicle may refer to a particular place or a position of the vehicle. For example, the map component 114 may obtain map information for an area based on the vehicle being located within the area. As another example, the map component 114 may obtain map information for an area, with the extent (e.g., size, shape) of the area being determined based on the location of the vehicle.

In some embodiments, the map component 114 may obtain map information based on a movement of the vehicle. A movement of the vehicle may include a present movement of the vehicle or a planned (e.g., future) movement of the vehicle. For example, based on the vehicle moving in a particular direction (e.g., forward direction), the map component 114 may obtain map information for an area in the particular direction (e.g., map information characterizing a road configuration in front of the vehicle). As another example, based on the vehicle moving at a particular rate (e.g., speed or acceleration), the map component 114 may obtain map information for an area, with the extent (e.g., size, shape) of the area being determined based on the rate of movement of the vehicle.

The sensor range component 116 may be configured to determine a sensor range configuration for the vehicle based on the road configuration in the environment of the vehicle. A sensor range configuration may refer to an amount of sensor information to be processed for vehicle navigation. A sensor range configuration may refer to information used in determining an amount of sensor information to be processed for vehicle navigation. For example, a sensor range configuration may define a range of data points (e.g., 20 meters within the vehicle) within a point cloud to be processed to detect objects around the vehicle. A sensor range configuration may define one or more portion of sensor information to be processed for vehicle navigation. For example, a sensor range configuration may define one or more shapes to be used in processing sensor information. Shape(s) defined by the sensor range configuration may include two-dimensional shape(s) or three-dimensional shape(s). For example, a sensor range configuration may be defined as one or more two-dimensional shapes (e.g., circle, oval, triangle, pyramid, square, rectangle, polygon) or one or more three-dimensional shapes (e.g., sphere, cube, box, 3D polygon).

The sensor range component 116 may identify one or more regions of interest based on the road configuration in the environment of the vehicle. The region(s) of interest include those area(s) within the environment of the vehicle for which sensor information is desired to be processed. The region(s) of interest may include those area(s) within the environment of the vehicle that have (greater) significance in determining navigation for the vehicle. The region(s) of interest may include those area(s) within the environment of the vehicle to which the vehicle may move. The region(s) of interest may include those area(s) within the environment of the vehicle in which one or more objects (e.g., other vehicles, persons, animals, traffic light) that may affect vehicle navigation may be located.

For example, the region(s) of interest may include one or more portions of a road on which the vehicle is traveling. As another example, the region(s) of interest may include one or more portions of a road which may impact the travel of the vehicle, such as a road that intersects with a road on which the vehicle is traveling. As yet another example, the region(s) of interest may include one or more portions of a lane on which the vehicle is traveling or one or more portions of a lane which may impact the travel of the vehicle, such as a lane near or adjacent to the lane on which the vehicle is traveling.

The sensor range component 116 may determine different sensor range configurations (e.g., different ranges, different shapes) based on different road configurations. For example, the sensor range component 116 may use the physical arrangement of road(s) in the environment of the vehicle or how traffic on the road(s) is flowing to determine which portions of the sensor information will be processed for vehicle navigation. The sensor range component 116 may dynamically configure which portion(s) of the sensor information will be processed for vehicle navigation, such as for object detection, based on how the roads are arranged or how the traffic is flowing. For example, the sensor range configuration determined by the sensor range component 116 may be different for a road configuration including an intersection versus a road configuration including a straight one-way road.

In some embodiments, the sensor range component 116 may determine a sensor range configuration by identifying a sensor range configuration associated with a road configuration. For example, the sensor range component 116 may access one or more databases or tables that match different road configurations with different sensor range configurations. The sensor range component 116 may determine a sensor range configuration for a road configuration by accessing the database(s)/table(s) and identifying the sensor range configuration matched with the road configuration. For example, a road configuration including a narrow and straight road may be matched with a sensor range configuration defining an area (e.g., rectangular area) that include more of the area in front of the vehicle than areas to the sides of the vehicle. As another example, a road configuration including an intersection may be matched with a sensor range configuration defining an area that extends from the middle of the intersection, such as a square or a circular area centered on the middle of the intersection. As yet another example, a road configuration including an intersection with protected turn(s) may be matched with a sensor range configuration that is different from an intersection with unprotected turn(s).

In some embodiments, the sensor range component 116 may determine a sensor range configuration based on one or more rules. For example, one or more rules may specify a default or base sensor range configuration. One or more rules may specify how a combination of road features affect sensor range configuration. One or more rules may specify how a sensor range configuration may be changed based on one or more features detected within the road configuration. For example, one or more rules may define how the default or base sensor range configuration may be changed based on whether the road configuration includes or does not include a pedestrian walkway, based on the speed limit, based on information on traffic flow, based on types of intersections, based on physical features of the road (e.g., curvature, grade, type), or based on other features of the road configuration. Other determinations of sensor range configuration based on road configuration are contemplated.

In some embodiments, the sensor range configuration for a vehicle may be determined further based on a movement of the vehicle. A movement of the vehicle may include a present movement of the vehicle or a planned (e.g., future) movement of the vehicle. For example, based on the vehicle moving in a particular direction (e.g., forward direction), the sensor range component 116 may determine a sensor range configuration to include an area in the particular direction (e.g., region of interest includes an area in front of the vehicle). As another example, based on the vehicle moving at a fast rate (e.g., speed or acceleration), the sensor range component 116 may determine a sensor range configuration to include an longer area (e.g., region of interest is larger) than if the vehicle is moving at a slow rate.

The sensor range component 116 may determine sensor range configurations at different times and in different locations. For example, the sensor range component 116 may determine sensor range configurations periodically (e.g., in time, in distance). The intervals at which the sensor range component 116 determines sensor range configurations may change based on vehicle operation, such as based on vehicle speed or vehicle acceleration. The sensor range component 116 may determine sensor range configurations based on changes in road configuration. For example, the sensor range component 116 may determine sensor range configurations or change previously determined sensor range configuration based on changes in the road configuration.

The sensor range component 116 may determine sensor range configurations based on a planned route of a vehicle. For example, a vehicle may be travelling along a planned route, and the sensor range component 116 may determine different sensor range configurations for different locations along the route. The vehicle's use of the planned route may enable the sensor range component 116 to predetermine the sensor range configurations for the vehicle rather than determining the sensor range configurations as the vehicle reaches different locations. The sensor range configurations may be determined at different intervals along the planned route or based on changes in the road configuration along the planned route.

The process component 118 may be configured to process one or more portions of the sensor information for vehicle navigation based on the sensor range configuration. That is, rather than processing the entirety of the sensor information, the process component 118 may limit the processing of the sensor information to a subset of the sensor information. For example, the sensor information may define a two or three-dimensional point cloud, and the sensor configuration may define a two or three-dimensional shape. The process component 118 may process the portion(s) of the point cloud within the shape defined by the sensor configuration for vehicle navigation. Thus, the amount or the portion(s) of sensor information that is processed for vehicle navigation may be dynamically changed based on the road configuration in the environment of the vehicle. The process component 118 may filter out one or more portions of the sensor information from analysis for vehicle navigation. For example, one or more portions of the sensor information corresponding to area in front, rear, sides, above, or below the vehicle may be filtered out from being processed for vehicle navigation.

Such processing of sensor information may enable the process component 118 to analyze the portion of the sensor data that is (more) relevant for vehicle navigation. Such analysis of relevant sensor data may provide for accurate and timely processing of information combined with reduction in expenditure of processing resources. For example, processor(s) that analyze the sensor information for vehicle navigation may have a maximum bandwidth of information that may be processed for a period of time, and the process component 118 may filter out less relevant sensor information from being processed during the period of time.

For instance, processing of sensor information for vehicle navigation may include analysis of the sensor information for object detection in the environment of the vehicle. Dynamically changing which portion(s) of the sensor information are processed based on the road configuration in the environment of the vehicle may enable the process component 118 to more accurately and more quickly detect objects within the relevant portion(s) of the environment while reducing the amount of processing resources (e.g., time, power, bandwidth) required for object detection. As another example, processing of sensor information for vehicle navigation may include analysis of the sensor information to determine how the vehicle should be navigated within or through the environment. Dynamically changing which portion(s) of the sensor information are processed based on the road configuration in the environment of the vehicle may enable the process component 118 to more efficiently determine vehicle navigation within the relevant portion(s) of the environment and reduce the amount of processing resources (e.g., time, power, bandwidth) required for determination of the vehicle navigation.

Figure 2:
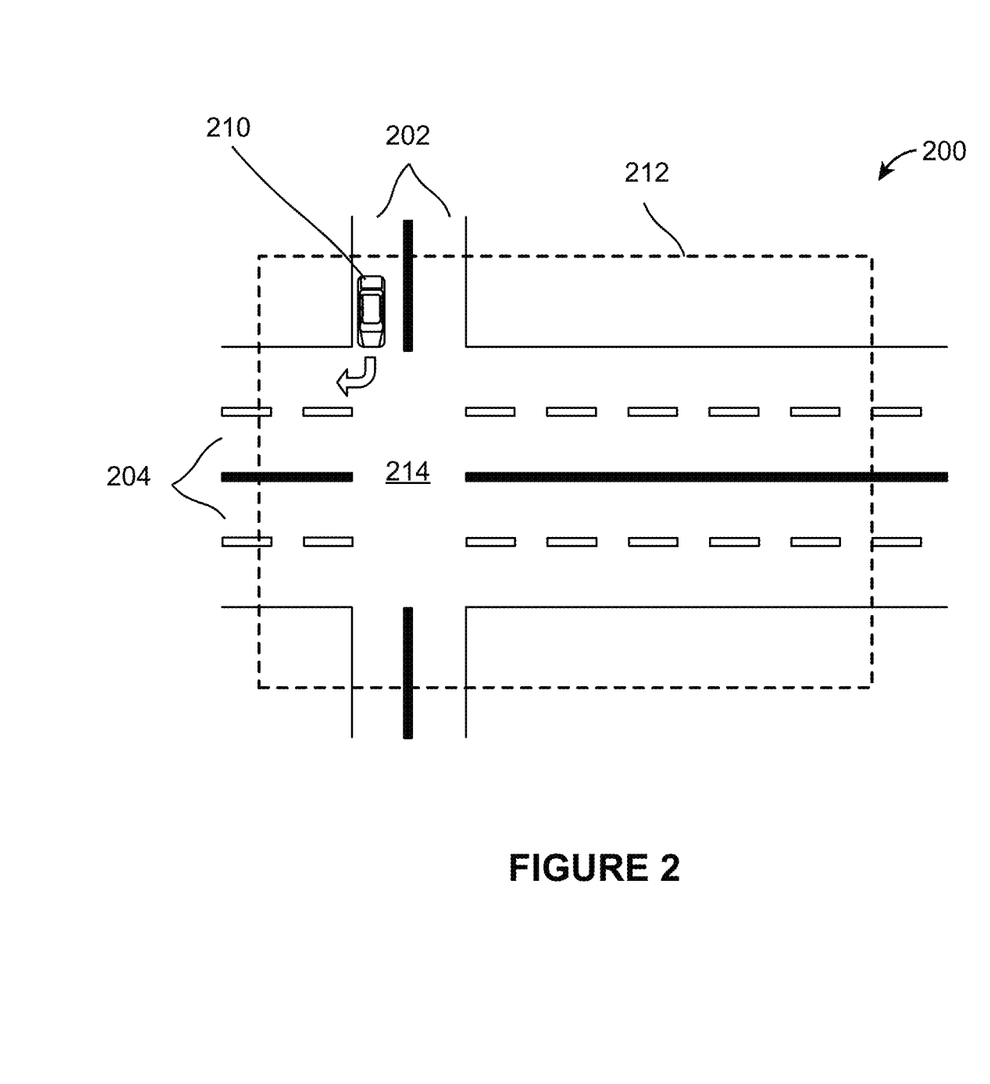
FIG. 2 illustrates an example scenario for sensor range configuration determination, in accordance with various embodiments of the disclosure.

FIG. 2 illustrates an example scenario 200 for sensor range configuration determination, in accordance with various embodiments of the disclosure. The scenario 200 may include an intersection 214 of roads 202, 204. A vehicle 210 may be located on the road 202. The vehicle 210 may be planning on making a right turn at the intersection 214. The road configuration for the scenario 200 may include the physical arrangements of the roads 202, 204, including the intersection 214. The road configuration for the scenario 200 may include the flow of traffic on the roads 202, 204.

Based on the road configuration for the scenario 200, a sensor range configuration 212 may be determined for the vehicle 210. The sensor range configuration 212 may identify or define a region of interest within the scenario 200. For example, based on the road configuration for the scenario 200, the shape and the size of the sensor range configuration 212 may be determined to include the region of interest within the scenario 200, which may include a rectangular area around and including the intersection 214. The sensor range configuration 212 may be further refined based on the movement of the vehicle 210. For example, based on the planned maneuver of the vehicle 210 to turn right at the intersection 214, the sensor range configuration 212 may be changed to remove portion(s) of the road 204 (e.g., a lower portion of the road 204 to the right of the intersection 214). As another example, based on the planned maneuver of the vehicle 210 to turn right at the intersection 214, the sensor range configuration 212 may be changed to remove a left portion of the road 202 below the intersection 214 and add more of the right portion of the road 202 below the intersection 214.

Figure 3:
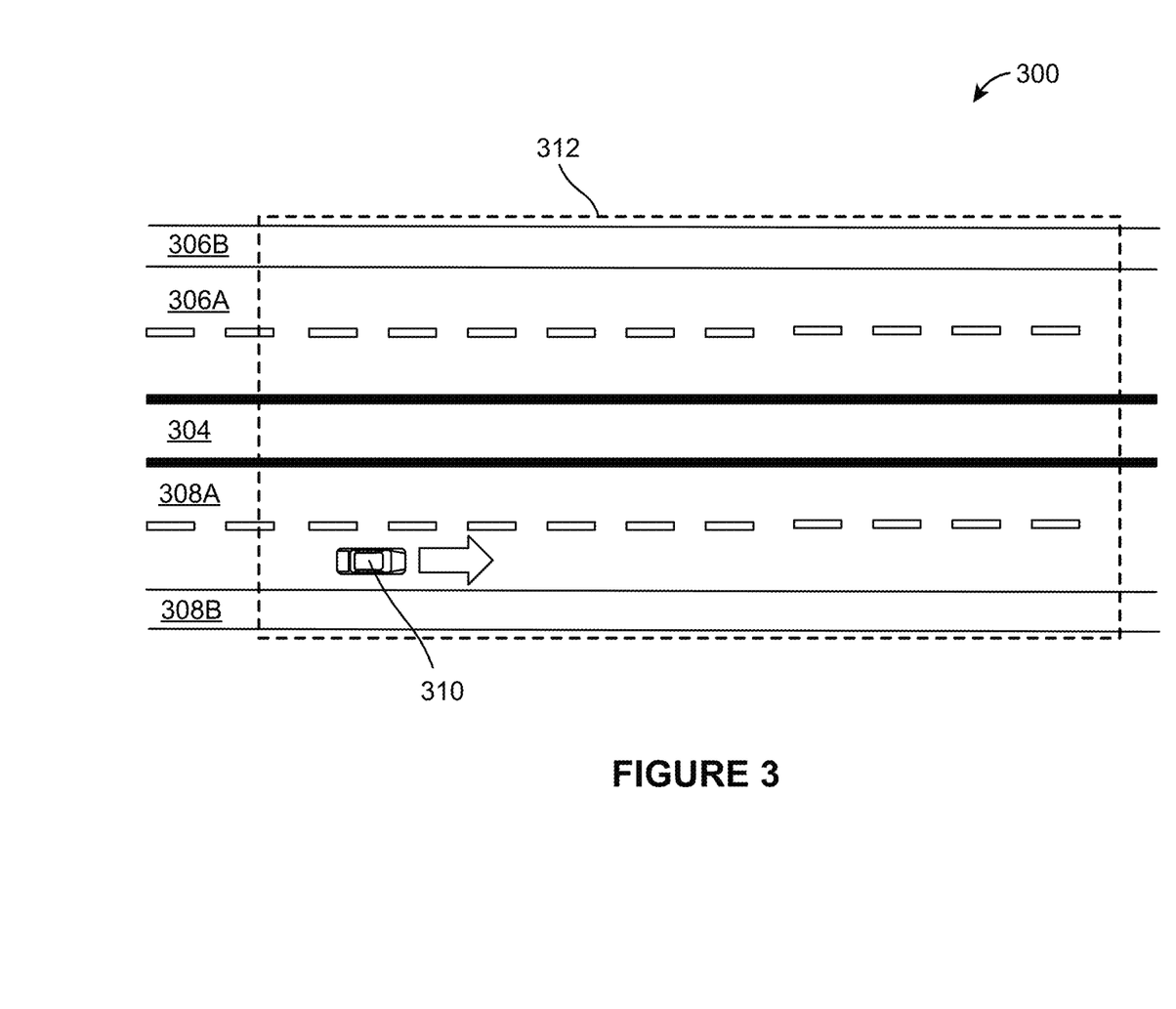
FIG. 3 illustrates an example scenario for sensor range configuration determination, in accordance with various embodiments of the disclosure.

FIG. 3 illustrates an example scenario 300 for sensor range configuration determination, in accordance with various embodiments of the disclosure. The scenario 300 may include roads 306A, 308A, pedestrian walkaways 306B, 308B, and a divider/center lane 304. A vehicle 310 may be located on the right lane of the road 308A. The vehicle 310 may be moving straight on the right lane of the road 308A. The road configuration for the scenario 200 may include the physical arrangements of the roads 306A, 308A, the pedestrian walkaways 306B, 308B, and the divider/center lane 304. The road configuration for the scenario 300 may include the flow of traffic on the roads 306A, 308A, and the divider/center lane 304.

Based on the road configuration for the scenario 300, a sensor range configuration 312 may be determined for the vehicle 310. The sensor range configuration 312 may identify or define a region of interest within the scenario 300. For example, based on the road configuration for the scenario 300, the shape and the size of the sensor range configuration 312 may be determined to include the region of interest within the scenario 300, which may include a long rectangular area including the roads 306A, 308A, the pedestrian walkaways 306B, 308B, and the divider/center lane 304.

The sensor range configuration 212 may be further refined based on the movement of the vehicle 310. For example, based on the vehicle 310 moving at a slow rate (e.g., slow speed, slow acceleration), the sensor range configuration 312 may be shortened to include smaller area in front of the vehicle 310. As another example, based on the vehicle 310 moving at a fast rate (e.g., fast speed, fast acceleration), the sensor range configuration 312 may be lengthened to include larger area in front of the vehicle 310.

Figure 4:
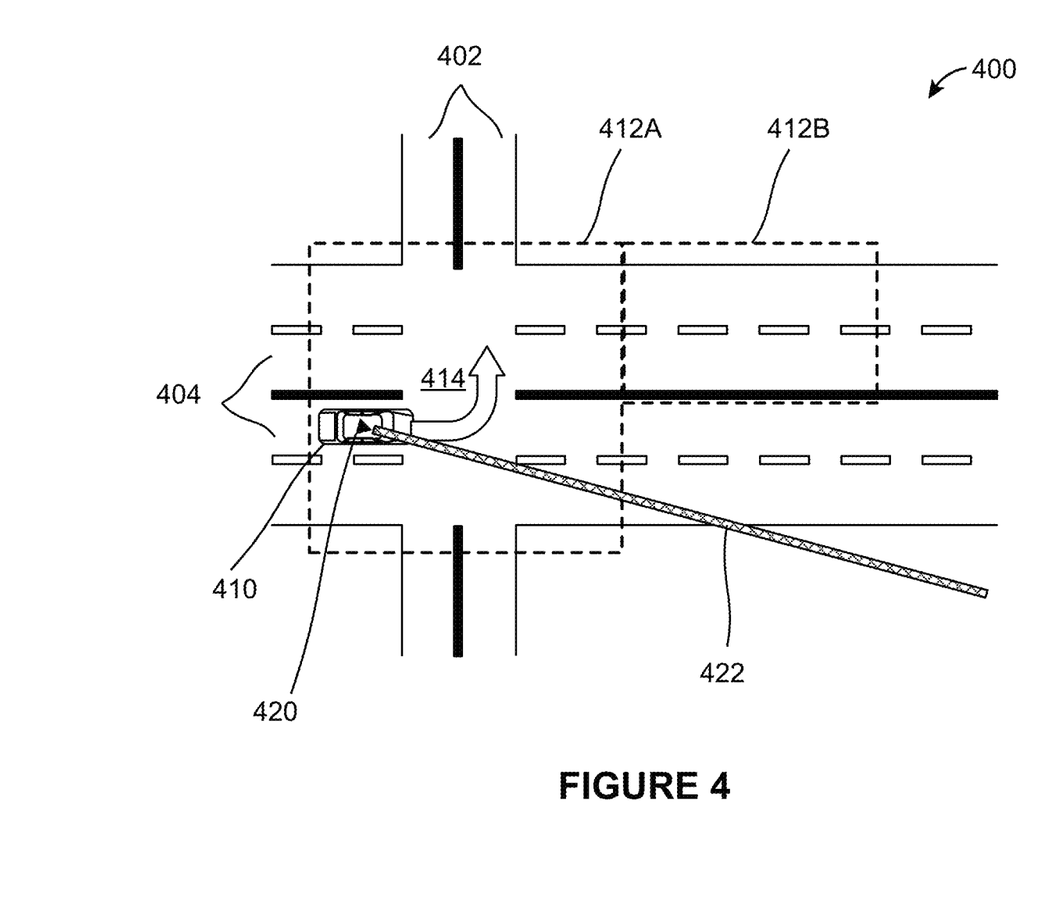
FIG. 4 illustrates an example scenario for sensor range configuration determination, in accordance with various embodiments of the disclosure.

FIG. 4 illustrates an example scenario 400 for sensor range configuration determination, in accordance with various embodiments of the disclosure. The scenario 400 may include an intersection 414 of roads 402, 404. A vehicle 410 may be located on the left lane of the road 404. The vehicle 410 may include or carry a sensor 420. The sensor 420 may be used to generate sensor information characterizing positions of objects in the environment of the sensor 420. For example, the sensor 420 may include a LIDAR. The LIDAR may emit a beam 422 and measure reflection of the beam 422 to generate a point cloud of objects in the environment of the LIDAR. The sensor range of the LIDAR may include the area within the range of the beam 422. Processing all of the sensor information generated based on the LIDAR (sensor information characterizing positions of objects within the sensor range of the LIDAR) may require high expenditure of processing power and time.

The vehicle 410 may be planning on making a left turn at the intersection 414. The road configuration for the scenario 400 may include the physical arrangements of the roads 402, 404, including the intersection 414. The road configuration for the scenario 400 may include the flow of traffic on the roads 402, 404.

Based on the road configuration for the scenario 400, a sensor range configuration 412A may be determined for the vehicle 410. The sensor range configuration 412A may identify or define a region of interest within the scenario 400. For example, based on the road configuration for the scenario 400, the shape and the size of the sensor range configuration 412A may be determined to include the region of interest within the scenario 400, which may include a square area around and including the intersection 414. The sensor range configuration 412A may cover a smaller area than the area covered by the sensor range of the sensor 420.

The sensor range configuration for the scenario 400 may be further refined based on the movement of the vehicle 410. For example, based on the planned movement of the vehicle 410 make an unprotected left turn at the intersection 414, the sensor range configuration 412B (covering a rectangular area to the right of the intersection 414 and including an upper portion of the road 404) may be combined with the sensor range configuration 412A. The sensor range configuration 412B may enable detection of oncoming traffic. That is, the sensor range configuration for the scenario 400 may include a square area and a rectangular area.

Figure 5A:
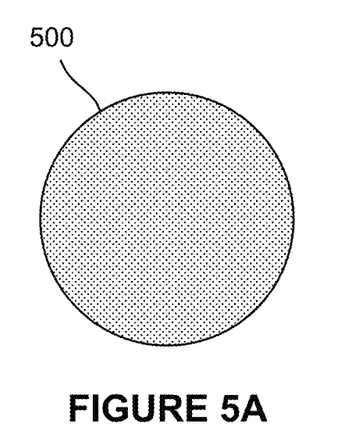
FIG. 5A illustrates an example point cloud, in accordance with various embodiments of the disclosure.

FIG. 5A illustrates an example point cloud 500, in accordance with various embodiments of the disclosure. The point cloud 500 may be generated based on one or more sensor readings, such as a LIDAR carried by a vehicle. The point cloud 500 may characterize the positions of objects in an environment of the vehicle. For example, top half of the point cloud 500 may characterize the positions of objects in front of the vehicle and the bottom half of the point cloud 500 may characterize the positions of objects behind the vehicle. Data points within point cloud 500 may represent positions of objects in the environment of the vehicle.

Although the point cloud 500 is shown in FIG. 5A as a two-dimensional circle, this is merely for ease of reference and is not meant to be limiting. For example, the point cloud 500 may represent a three-dimensional object, such as a sphere or a hemisphere.

Figure 5B:
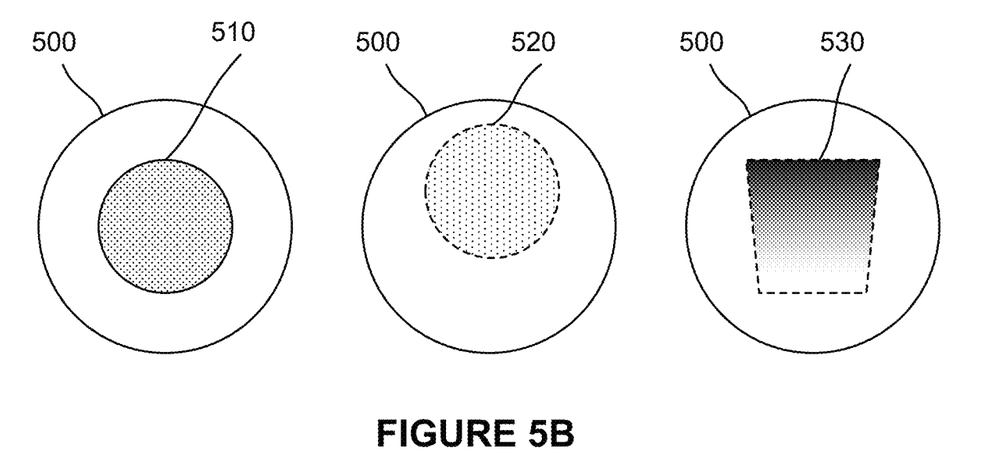
FIG. 5B illustrates example portions of a point cloud, in accordance with various embodiments of the disclosure.

FIG. 5B illustrates example portions 510, 520, 530 of the point cloud 500, in accordance with various embodiments of the disclosure. The portions 510, 520, 530 may be defined by different sensor range configurations. That is, different sensor range configurations may define different portions 510, 520, 530 of the point cloud 500 to be processed for vehicle navigation. For example, the portion 510 may include a smaller circular portion or a smaller spherical portion of the point cloud 500, with the portion 510 and the point cloud 500 being concentric. As another example, the portion 520 may include a smaller circular portion or a smaller spherical portion of the point cloud 500, with the portion 520 and the point cloud 500 not being concentric (e.g., including greater area or volume of the point cloud 500 in front of the vehicle than in the back of the vehicle). As yet another example, the portion 530 may include a polygonal shape within the point cloud 500.

The point density of the portions 510, 520, 530 may be the same as or different from the point cloud 500. For example, the sensor range configuration for the portion 510 may define or use the same point density as the point cloud 500. As another example, the sensor range configuration for the portion 520 may define or use a lower point density than the point cloud 500. Using lower point density in the portion 520 may enable greater reduction in processing resources required to analyze/process the data corresponding to the portion 520. As yet another example, the sensor range configuration for the portion 530 may define or use a gradient point density, where the point density of the portion 530 in front of the vehicle is greater than the point densify of the portion 530 behind the vehicle. Such change of point density within the portion 530 may enable more accurate detection of objects in front of the vehicle than objects behind the vehicle.

Figure 5C:
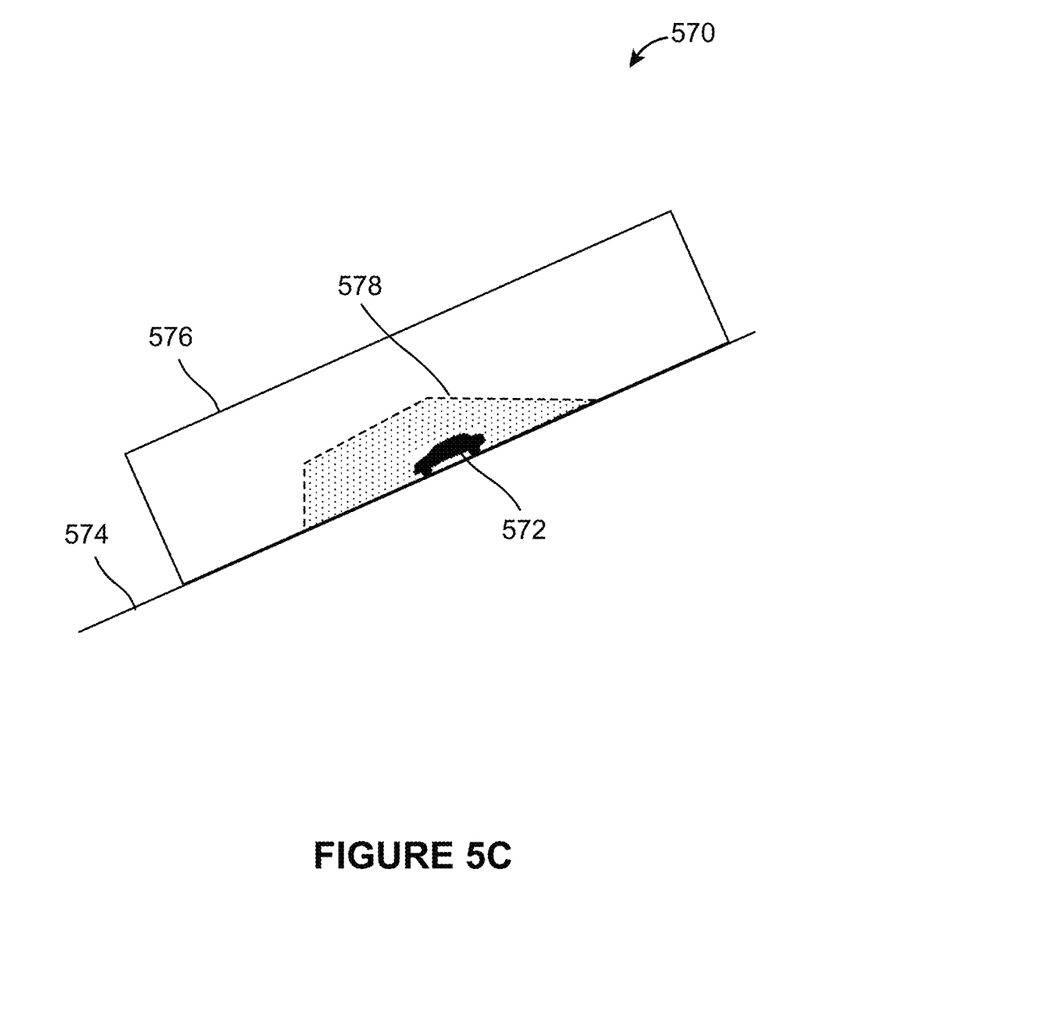
FIG. 5C illustrates an example portion of a vehicle environment, in accordance with various embodiments of the disclosure.

FIG. 5C illustrates an example portion of a vehicle environment, in accordance with various embodiments of the disclosure. The point cloud may characterize the positions of objects in an environment 576 of a vehicle 572. The vehicle 572 may be on a slope 574. A sensor range configuration for the vehicle 572 may be determined based on the slope 572 to define a portion 578 of the environment 576. The portion 578 may be defined in three-dimensions. For example, the portion 578 may be defined as a three-dimensional polygonal shape. The portion 578 may define the portion of the point cloud that is to be processed for navigation of the vehicle 572. The portion 578 may be use to filter out portions of the point cloud 576 from being processed for navigation of the vehicle 572. That is, only the portion of the point cloud corresponding to the areas or volumes within the portion 578 may be processed for vehicle navigation.

Figure 6:
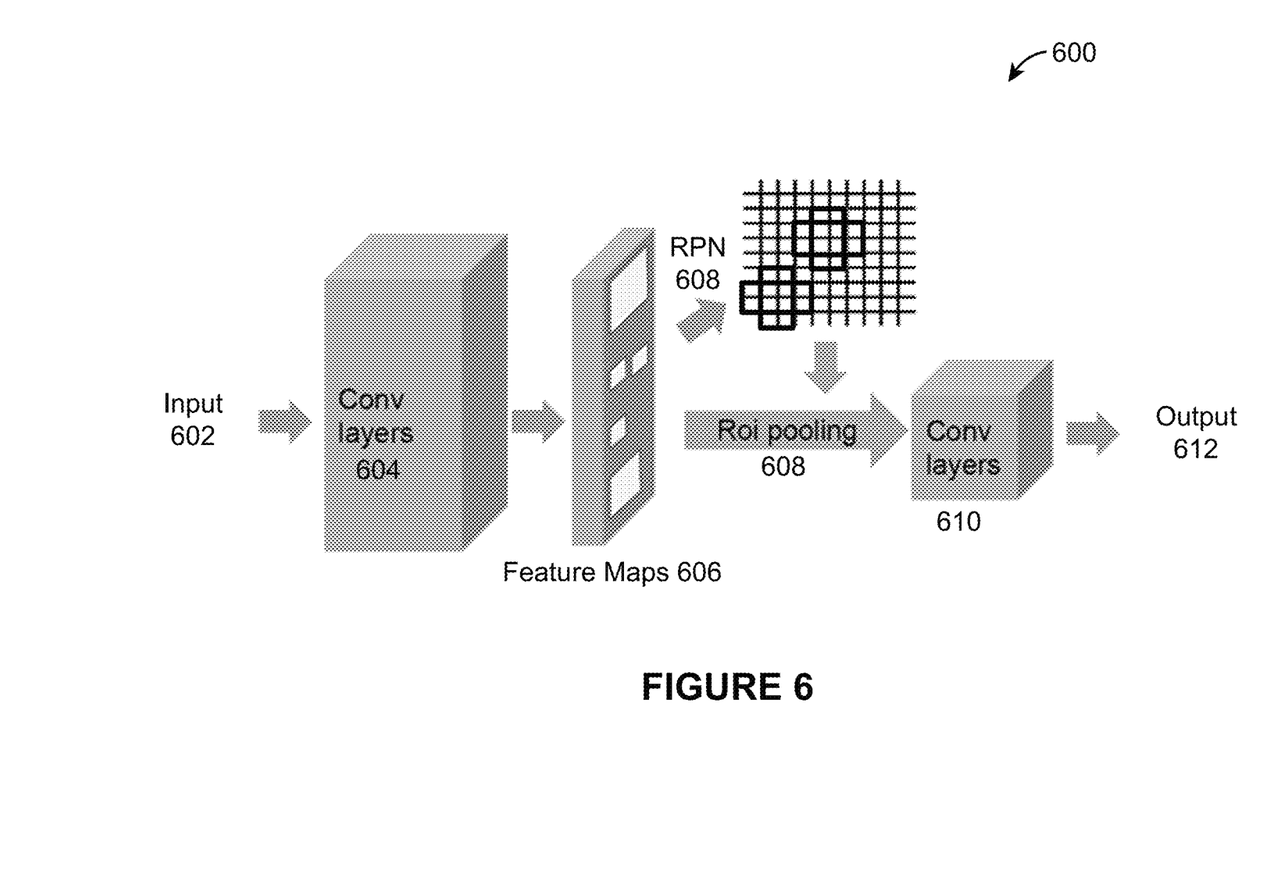
FIG. 6 illustrates an example processing of inputs of varying sizes, in accordance with various embodiments of the disclosure.

FIG. 6 illustrates an example flow 600 of processing of inputs of varying sizes, in accordance with various embodiments of the disclosure. The flow 600 may be used to perform object detection or object classification. For example, an input 602 may include a portion of sensor information, such as a portion of a three-dimensional point cloud. The portion of the three-dimensional point cloud may be carved out based on a sensor configuration. The portion of the three-dimensional point cloud may be projected into a two-dimensional space as an image for analysis using the flow 600. The dimensions of the image (the input 602) may vary based on the sensor range configuration. For example, the dimensions of the image may vary based on the shape of the sensor range configuration.

The input 602 may be processed through convolutional layers 604, which may output feature maps 606. The feature maps 606 may be processed through a region proposal network 608, which may identify one or more bounding boxes. The region proposal network 608 may be fully convolutional to receive input 602 of different dimensions. A region of interest pooling 608 may resize bounding boxes of different sizes into the same size. Convolutional layer 610 may be used to generate an output 612 The output 612 may include detection or classification of object(s) within the bounding boxes.

Figure 7:
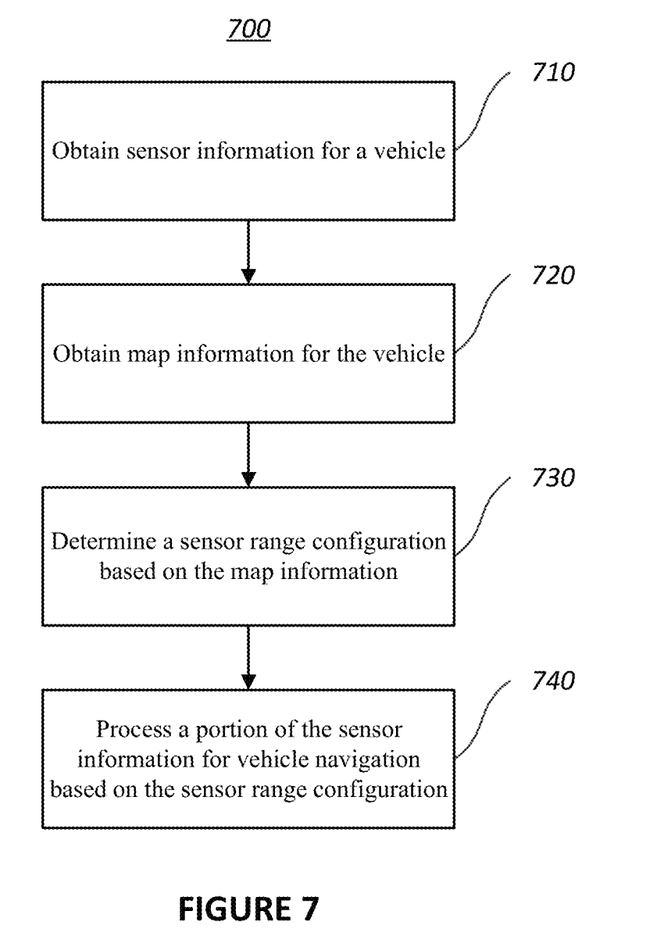
FIG. 7 illustrates a flow chart of an example method, in accordance with various embodiments of the disclosure.

FIG. 7 illustrates a flowchart of an example method 700, according to various embodiments of the present disclosure. The method 700 may be implemented in various environments including, for example, the environment 100 of FIG. 1. The operations of the method 700 presented below are intended to be illustrative. Depending on the implementation, the method 700 may include additional, fewer, or alternative steps performed in various orders or in parallel. The method 700 may be implemented in various computing systems or devices including one or more processors.

With respect to the method 700, at block 710, sensor information for a vehicle may be obtained. The sensor information may characterize positions of objects in an environment of a sensor. At block 720, map information for the vehicle may be obtained. The map information may characterize a road configuration in an environment of the vehicle. At block 730, a sensor range configuration for the vehicle may be determined based on the map information. That is, the sensor range configuration may be determined based on the road configuration in the environment of the vehicle. At block 740, a portion of the sensor information may be processed for vehicle navigation based on the sensor range configuration.

One or more blocks of the method 700 may be performed by one or more computer components that are the same as or similar to the components of the computing system 102 shown in FIG. 1. For example, the block 710 may be performed by a computer component the same as or similar to the sensor component 112. The block 720 may be performed by a computer component the same as or similar to the map component 114. The block 730 may be performed by a computer component the same as or similar to the sensor range component 116. The block 740 may be performed by a computer component the same as or similar to the process component 118.

Figure 8:
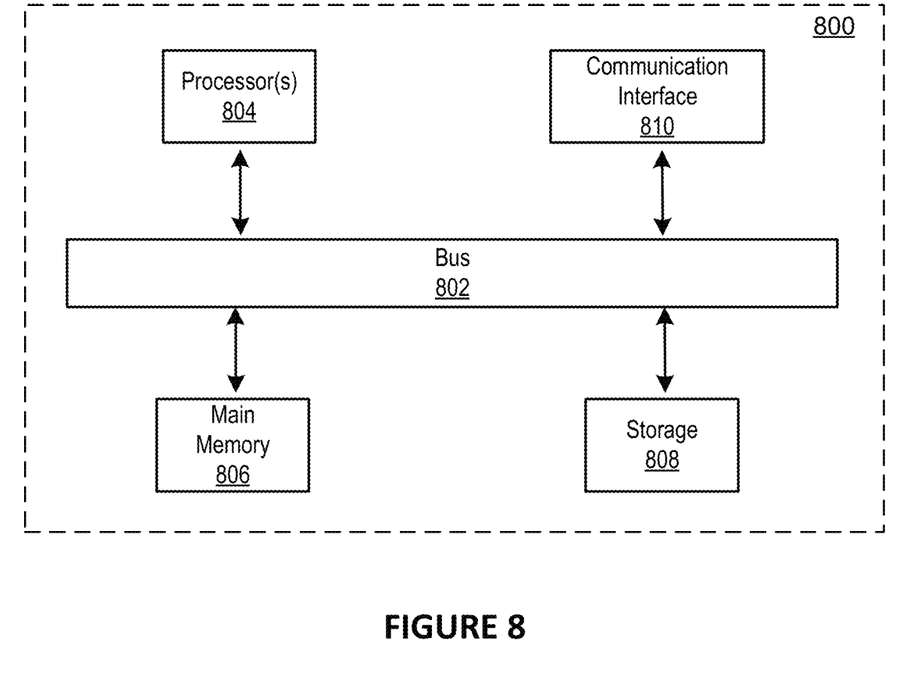
FIG. 8 illustrates a block diagram of an example computer system in which any of the embodiments described herein may be implemented.

FIG. 8 is a block diagram that illustrates a computer system 800 upon which any of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor(s) 804. Main memory 806 also may be used for storing temporary variables or other intermediate information during execution of instructions to be executed by processor(s) 804. Such instructions, when stored in storage media accessible to processor(s) 804, render computer system 800 into a special-purpose machine that is customized to perform the operations specified in the instructions. Main memory 806 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, an EPROM, a FLASH-EPROM, NVRAM, any other memory chip or cartridge, and networked versions of the same.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 808. Execution of the sequences of instructions contained in main memory 806 causes processor(s) 804 to perform the process steps described herein.

For example, the computing system 800 may be used to implement the computing system 102 or one or more components of the computing system 102 shown in FIG. 1. As another example, the process/method shown in FIG. 7 and described in connection with this figure may be implemented by computer program instructions stored in main memory 806. When these instructions are executed by processor(s) 804, they may perform the steps as shown in FIG. 7 and described above. In alternative embodiments, hard-wired circuitry may be used in place of or in combination with software instructions.

The computer system 800 also includes a communication interface 810 coupled to bus 802. Communication interface 810 provides a two-way data communication coupling to one or more network links that are connected to one or more networks. As another example, communication interface 810 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system for dynamic range detection, the system comprising:
   one or more processors; and
   a memory storing instructions that, when executed by the one or more processors, cause the system to perform:
      obtaining sensor information, the sensor information defining a three-dimensional (3D) point cloud that characterizes positions of objects in an environment of a sensor;
      obtaining map information, the map information characterizing road intersections and exits in an environment of a vehicle;
      determining, based on the map information, that the vehicle is traveling along a planned route, wherein the planned route comprises making one or more planned maneuvers at one or more road intersections and exits that the vehicle has not reached yet;
      determining a sensor range configuration based on the one or more planned maneuvers before the vehicle reaches the one or more road intersections and exits and a speed of the vehicle, the sensor range configuration including a region of interest, wherein the region of interest is a sub-region of the 3D point cloud, and the determining comprises:
         determining the sub-region of the 3D point cloud that is either a spherical or a polygonal shape;
         determining a point density for the sub-region that is lower than a point density of the 3D point cloud;
         reducing the region of interest if the vehicle lowers its speed, and enlarging the region of interest if the vehicle increases its speed; and
      processing the sub-region of the 3D point cloud with the determined point density.

2. A system for dynamic range detection, the system comprising:
   one or more processors; and
   a memory storing instructions that, when executed by the one or more processors, cause the system to perform:
      obtaining sensor information, the sensor information that defines a three-dimensional (3D) point cloud characterizing positions of objects in an environment of a sensor;
      obtaining map information, the map information characterizing road intersections and exits in an environment of a vehicle;
      determining, based on the map information, that the vehicle is traveling along a planned route, wherein the planned route comprises making one or more planned maneuvers at one or more road intersections and exits that the vehicle has not reached yet;
      determining a sensor range configuration based on the one or more planned maneuvers before the vehicle reaches the one or more road intersections and exits and a speed of the vehicle, the sensor range configuration including a region of interest, wherein the region of interest is a sub-region of the 3D point cloud, and the determining comprises:
    determining the sub-region of the 3D point cloud that is either a spherical or a polygonal shape;
    determining a point density for the sub-region that is lower than a point density of the 3D point cloud;
    reducing the region of interest if the vehicle lowers its speed, and enlarging the region of interest if the vehicle increases its speed; and
processing the sub-region of the 3D point cloud with the determined point density.

3. The system of claim 2, wherein the sensor range configuration is defined in two-dimensions.

4. The system of claim 2, wherein the sensor range configuration is defined in three-dimensions.

5. The system of claim 2, wherein the sensor includes a LIDAR, and the three-dimensional (3D) point cloud characterizing the positions of the objects in the environment of the LIDAR.

6. The system of claim 2, wherein the map information further characterizes another road configuration in the environment of the vehicle includes a physical arrangement of one or more roads in the environment of the vehicle, and the planned route further comprises planned maneuvers according to the other road configuration.

7. The system of claim 6, wherein the physical arrangement of the one or more roads includes a curvature, a grade, an on-ramp, or a number of lanes of the one or more roads.

8. A method for dynamic range detection, the method comprising:
    obtaining sensor information, the sensor information that defines a three-dimensional (3D) point cloud characterizing positions of objects in an environment of a sensor;
    obtaining map information, the map information characterizing road intersections and exits in an environment of a vehicle;
    determining, based on the map information, that the vehicle is traveling along a planned route, wherein the planned route comprises making one or more planned maneuvers at one or more road intersections and exits that the vehicle has not reached yet;
    determining a sensor range configuration based on the one or more planned maneuvers before the vehicle reaches the one or more road intersections and exits and a speed of the vehicle, the sensor range configuration including a region of interest, wherein the region of interest is a sub-region of the 3D point cloud, and the determining comprises:
        determining the sub-region of the 3D point cloud that is either a spherical or a polygonal shape;
        determining a point density for the sub-region that is lower than a point density of the 3D point cloud;
        reducing the region of interest if the vehicle lowers its speed, and enlarging the region of interest if the vehicle increases its speed; and
processing the sub-region of the 3D point cloud with the determined point density.

9. The method of claim 8, wherein the sensor range configuration is defined in two-dimensions.

10. The method of claim 8, wherein the sensor range configuration is defined in three-dimensions.

11. The method of claim 8, wherein the sensor includes a LIDAR, and the three-dimensional (3D) point cloud characterizing the positions of the objects in the environment of the LIDAR.

12. The method of claim 8, wherein the map information further characterizes another road configuration in the environment of the vehicle includes a physical arrangement of one or more roads in the environment of the vehicle, and the planned route further comprises planned maneuvers according to the other road configuration.

13. The method of claim 12, wherein the physical arrangement of the one or more roads includes a curvature, a grade, an on-ramp, or a number of lanes of the one or more roads.

* * * * *